Dec. 13, 1927.
J. W. WELSH
1,652,421
OPHTHALMIC MOUNTING AND METHOD
Filed July 24, 1924
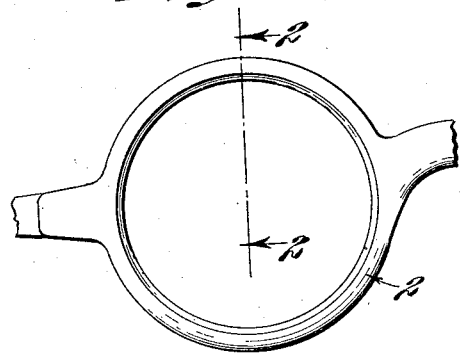
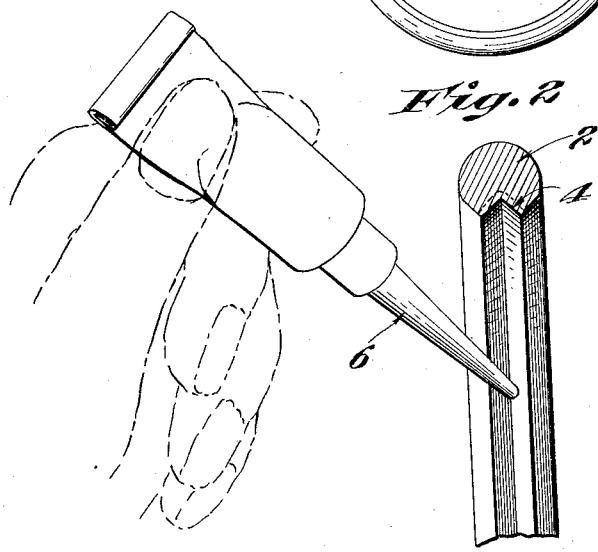
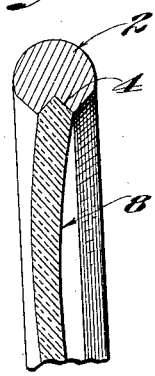
Inventor
James W. Welsh
by David Rines
Attorney Patented Dec. 13, 1927.

1,652,421

UNITED STATES PATENT OFFICE.

JAMES WILSON WELSH, OF PROVIDENCE, RHODE ISLAND, ASSIGNOR TO BAUSCH & LOMB OPTICAL COMPANY, OF ROCHESTER, NEW YORK, A CORPORATION OF NEW YORK.

OPHTHALMIC MOUNTING AND METHOD.

Application filed July 24, 1924. Serial No. 727,962.

The present invention relates to ophthalmic mountings, and more particularly to methods of mounting lenses in the lens-holding grooves of such mountings.

Lenses have a tendency to turn in their mountings. This is particularly true if the lenses are more or less circular, as is generally the case in connection with ophthalmic mountings constituted of non-metallic material, like zylonite. The turning of some types of lenses, like those intended to correct errors of astigmatism, is a serious matter. Many proposals have therefore been made to prevent such turning. Among such proposals, for example, is to cut a recess in the lens, the recess being intended to receive a locking element provided upon the mounting. Recessing lenses, however, has its objections.

According to the present invention, the walls of the lens-receiving groove are softened with a solvent, such as acetone, alcohol, or a compound comprising amyl acetate. The lens is then dug into the softened walls. When the material of the walls of the groove hardens, the lens is left securely locked in place.

The invention will be described more at length in connection with the accompanying drawings, in which Fig. 1 is a view of a mounting constructed according to a preferred embodiment of the present invention; Fig. 2 is a section of the mounting shown in Fig. 1, the section being taken upon the line 2—2 of Fig. 1, illustrating a step in the method of the present invention; and Fig. 3 is a similar section with the lens in place.

A zylonite mounting is illustrated at 2 provided with a lens-receiving groove 4. The walls of the groove may be softened with a solvent, which may be applied in any desired manner, as by means of a dropper 6. The solvent causes the walls of the groove 4 not only to soften, but also to expand, as from the dotted-line to the full-line position of Fig. 2. The solvent may be applied after the lens-holding member has first been heated to expand it, as is customary, to permit entry of the lens into the groove; or, if a mounting such as is illustrated and described in Letters Patent No. 1,520,977, granted December 30, 1924, is employed, the heating may be dispensed with. A lens 8 is now inserted in the groove. The lens digs its way into the softened zylonite, automatically securing for itself a tight fit. When the walls of the groove harden, the lens is found to have become tightly embedded therein.

The invention is obviously subject to modification by persons skilled in the art, and such modification is considered to fall within the spirit and scope of the present invention, as defined in the appended claims.

What is claimed is:

1. The method of mounting a lens in a lens-receiving groove of a lens-holding member constituted of zylonite that comprises softening the wall of the groove, and digging the lens into the softened wall of the groove.

2. The method of mounting a lens in a lens-receiving groove of a lens-holding member constituted of zylonite that comprises introducing a solvent into the groove to soften the walls of the groove, and digging the lens into the softened wall of the groove.

3. An article of the class described comprising a lens-holding member constituted of non-metallic material and having a lens-receiving groove the walls of which are lined with a solvent, and a lens mounted in the groove and dug into the lined walls of the groove.

4. An ophthalmic mounting comprising a lens-holding member constituted of zylonite having a lens-receiving groove, and a lens mounted in the groove and dug into the walls of the groove.

In testimony whereof, I have hereunto subscribed my name this 18th day of July, 1924.

JAMES W. WELSH.